United States Patent [19]

Hirose et al.

[11] Patent Number: 5,032,828
[45] Date of Patent: Jul. 16, 1991

[54] APPARATUS FOR DISPLAYING IMAGES FOR VEHICLES

[75] Inventors: Satoru Hirose; Shigeru Okabayashi, both of Kanagawa, Japan

[73] Assignee: Nissan Motor Company, Limited, Japan

[21] Appl. No.: 305,335

[22] Filed: Feb. 2, 1989

[30] Foreign Application Priority Data

Feb. 5, 1988 [JP] Japan .................. 63-13636

[51] Int. Cl.⁵ .......................... G09G 1/00; G09G 3/00
[52] U.S. Cl. .................... 340/702; 340/701; 340/784; 358/28
[58] Field of Search ............... 340/700, 701, 702, 705, 340/980, 784; 358/28; 350/347 V, 347 E, 339 F; 353/13, 14; 250/205

[56] References Cited

U.S. PATENT DOCUMENTS

| | | | |
|---|---|---|---|
| 2,495,200 | 1/1990 | Land | 358/66 |
| 4,550,339 | 10/1985 | Fling | 358/28 |
| 4,558,351 | 12/1985 | Fling et al. | 358/28 |
| 4,583,825 | 4/1986 | Buzak | 350/347 E |
| 4,758,818 | 7/1988 | Vatne | 340/702 |
| 4,788,586 | 11/1988 | Eckenbrecht | 358/28 |
| 4,890,902 | 1/1990 | Doane et al. | 340/705 |

FOREIGN PATENT DOCUMENTS 64-28066 2/1989 Japan .

Primary Examiner—Alvin E. Oberley
Assistant Examiner—Xiao Wu
Attorney, Agent, or Firm—Lowe, Price, LeBlanc & Becker

[57] ABSTRACT

An apparatus for displaying an image on a screen of a CRT (Cathode Ray Tube) applicable to a vehicle is disclosed in which the visual angle controlling filter (liquid crystal panel) is disposed in a front space of the screen of the CRT. When the vehicle runs, a predetermined voltage is applied to the visual angle controlling filter so that the light from the screen to a driver's seat is interrupted. At this time, the application of the voltage to the visual angle controlling filter is detected and a color hue of the image appearing on the screen is controlled so that all viewers except the vehicle driver can view the image on the screen through the visual angle controlling filter with the same color hue as that viewed when the vehicle stops and no application of the voltage to the visual angle controlling filter.

15 Claims, 6 Drawing Sheets

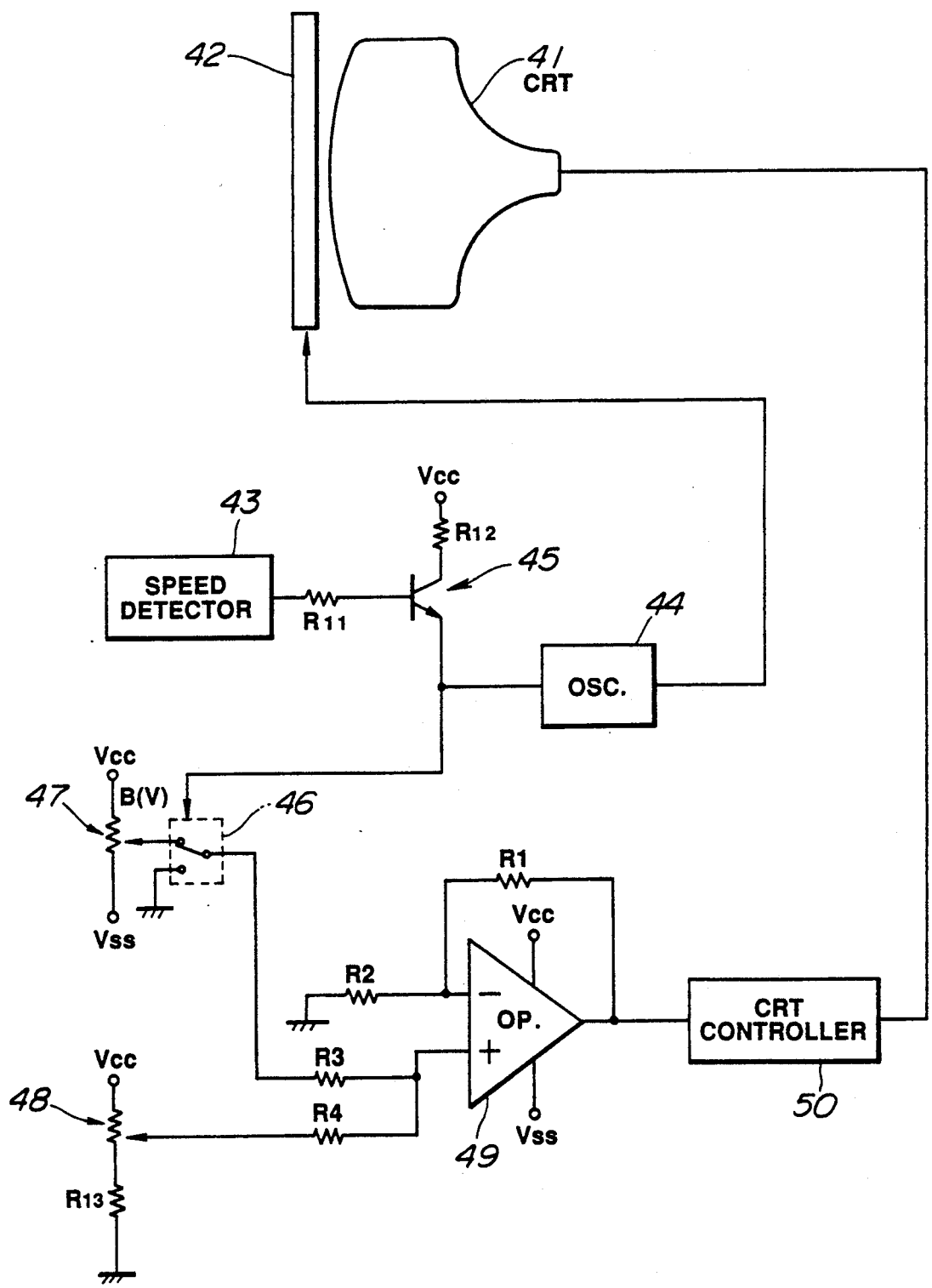

APPARATUS FOR DISPLAYING IMAGES FOR VEHICLES

BACKGROUND OF THE INVENTION

(1) Field of the Invention

The present invention relates to an apparatus for displaying images which controls a color hue of an image appearing on a screen of a cathode ray tube of a video equipment installed in a vehicle when a visual angle controlling filter such as a liquid crystal panel is installed in a front space of the screen of the CRT (Cathode Ray Tube) and a voltage is applied to the visual angle controlling filter.

(2) Background of the art

In a previously proposed image displaying apparatus, a louver type filter is disposed in front of a CRT (Cathode Ray Tube) so that a visible angle is limited to directions except a particular direction in order to prevent the images displayed on a screen of the CRT from viewing from a vehicular driver's seat during a drive of the vehicle in order to assure a safety driving.

When the vehicle runs, the louver type filter is mounted by a viewer in a front end of the CRT so that louvers in the filter cause a light directed to the driver's seat to be interrupted. However, since the louvers are designed so that the light toward passenger's seats except the driver's seat is not interrupted, thus the images on the CRT can be viewed from each of the passenger's seats.

In addition, when the vehicle stops and parks, the images on the CRT can be viewed from all vehicular seats including the driver's seat.

In another previously proposed image displaying apparatus, a liquid crystal panel is used as a visual angle controlling filter in place of the louver type filter since the louver type filter is inconvenient in its troublesome mounting and removal operations.

Controlling means applies a voltage to the liquid crystal panel during the run of the vehicle. The light from the CRT toward the driver's seat is thus interrupted. On the other hand, the light toward the passenger's seats except the driver's seat is not interrupted so as to enable viewing of the CRT from the passenger's seats. During the stop of the vehicle, the voltage is not applied to the liquid crystal panel so that the images on the screen of the CRT can be viewed from all directions.

However, since, in the latter previously proposed displaying apparatus, the liquid crystal panel has different light transmission factors according to a wavelength of the incident light during the application of voltage with the vehicle run, a color hue of the image on the screen of the CRT as viewed through the liquid crystal panel is varied so that the images on the screen of the CRT cannot clearly and correctly be viewed.

In addition, when the voltage application to the liquid crystal panel is turned off with the vehicle stopped, or vice versa (when the application is turned on with the vehicle started), the color hue is varied so that each viewer gives an unpleasant feeling.

SUMMARY OF THE INVENTION

It is an object of the present invention to provide an apparatus for displaying images on a screen of a video equipment applicable to vehicles in which the color hue of the image viewed through such a visual angle controlling filter is not varied even when the visual angle controlling filter is operated.

The above-described object can be achieved by providing an apparatus for displaying an image on a screen of a video equipment applicable to a vehicle, comprising: (a) a visual angle controlling filter for limiting a visual recognition area for the image appearing on the screen so that a light of the image on the screen directed toward a driver's seat of the vehicle is interrupted in response to an application of a voltage; (b) first means for detecting the vehicle run; (c) second means for controlling the application of voltage according to the result of detection that the vehicle run; (d) third means for detecting the application of voltage to the visual angle controlling filter; and (e) fourth means for controlling a color hue of the image on the screen in response to the detection result of the third means that the voltage is applied to the visual angle controlling filter.

The above-described object can also be achieved by providing an apparatus comprising: (a) a visual angle controlling filter located in front of a screen of a video equipment, the visual angle controlling filter being capable of viewing an image appearing on the screen of the video equipment therethrough in directions except a particular direction in response to an application of predetermined interrupting means thereto; (b) first means for detecting a condition of the application of the predetermined interrupting means; (c) second means for controlling the application of the predetermined interrupting means according to the result of the detection of the condition; (d) third means for detecting whether the predetermined interrupting means is applied to the visual angle controlling filter; (e) fourth means for controlling a color hue of the image appearing on the screen of the video equipment in response to the result of detection by the third means so that the color hue of the image on the screen as viewed through the visual angle controlling filter does not change irrespective of the application of the predetermined interrupting means.

BRIEF DESCRIPTION OF THE DRAWINGS

FIG. 7 is a schematic circuit block diagram of a second preferred embodiment of the image displaying apparatus according to the present invention.

DETAILED DESCRIPTION OF THE PREFERRED EMBODIMENTS

Reference will hereinafter be made to the drawings in order to facilitate understanding of the present invention.

Figure 1:
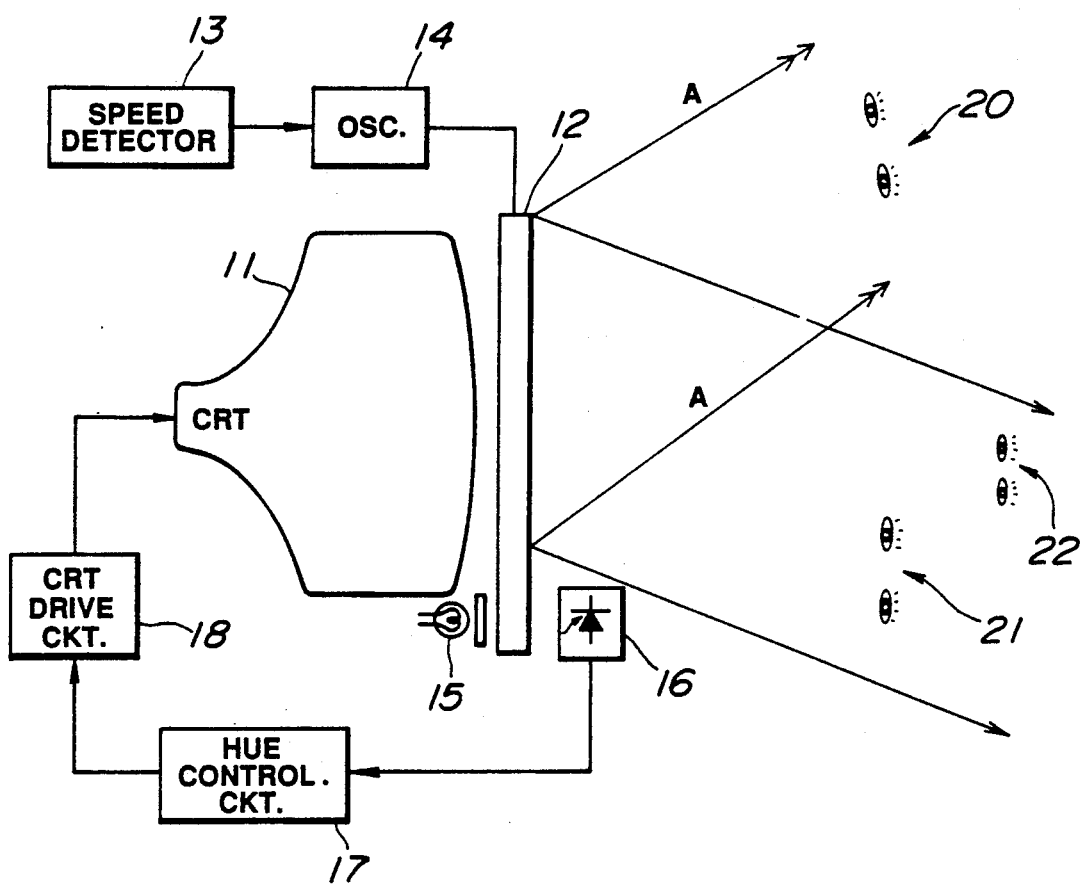
FIG. 1 is a schematic circuit block diagram in a first preferred embodiment of an image displaying apparatus according to the present invention.

FIG. 1 shows a first preferred embodiment of an image displaying apparatus according to the present invention.

A liquid crystal panel 12 is disposed along a front screen of a CRT (Cathode Ray Tube) 11 so as to enclose the screen of the CRT. The CRT 11 is mounted in a vehicle body.

A vehicle speed detector 13 is installed in the vehicle for detecting a run state or stopped state of the vehicle. The speed detector 13 may, e.g., be a vehicle speedometer.

An oscillator 14 is connected between the speed detector 13 and liquid crystal panel 12 for controlling the visual angle controlling filter 12 in response to an output signal of the speed detector 13 indicating that the vehicle runs.

A light emitting element (electro-luminescent element) 15 is disposed in the vicinity of an edge of the liquid crystal panel 12 for detecting an operation of the liquid crystal panel 12.

It is noted that a photo diode 16 of a white balancer is disposed in an opposite side of the light emitting diode 16 with respect to the edge of the liquid crystal panel 12. The photo diode 16 is used to detect the color hue of the liquid crystal panel 12 and to adjust the color hue thereof.

In addition, a color hue controlling circuit 17 which operates in accordance with an information derived from the photo diode 16. The color hue controlling circuit 17 is connected to a CRT drive circuit 18.

Figure 2:
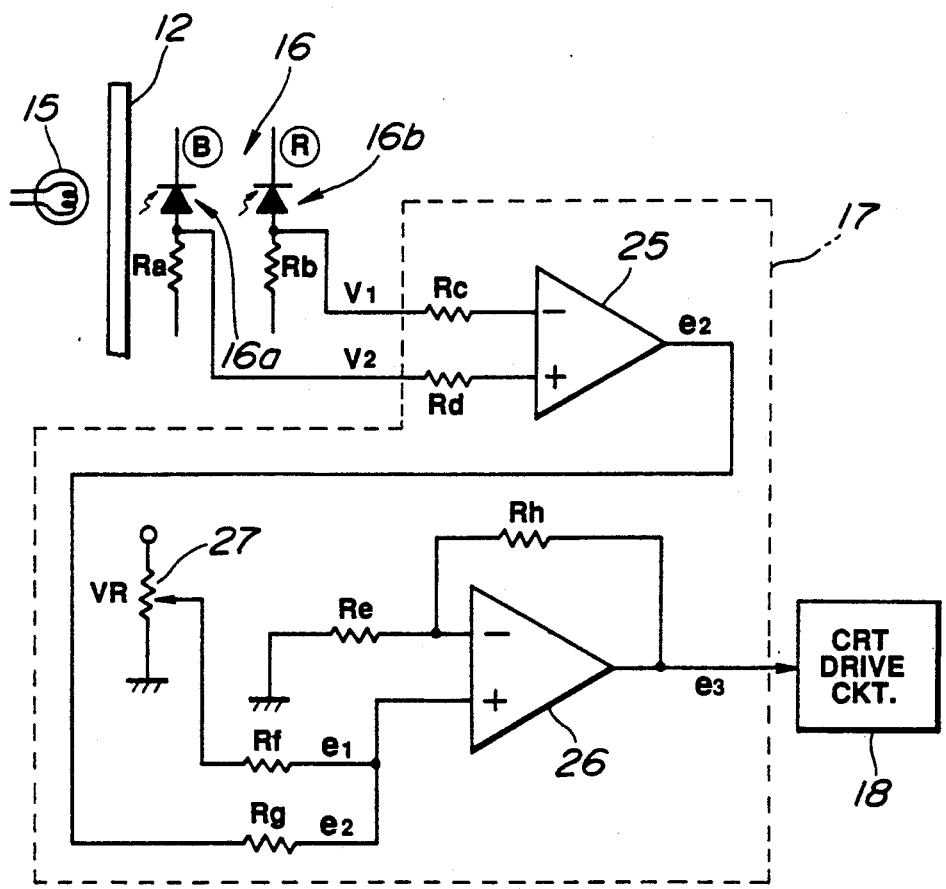
FIG. 2 is a schematic circuit wiring diagram of a color hue controlling circuit shown in FIG. 1.

The detailed structures of the photo diode 16 and color hue controlling circuit 17 are exemplified by FIG. 2.

The photo diode 16 shown in FIGS. 1 and 2 includes an element 16a for a blue level and another element 16b for a red level, both elements being disposed and wired in parallel to each other. Output voltages $V_1$ and $V_2$ of both elements 16a, 16b are supplied to both input terminals of a first operational amplifier 25 of the color hue controlling circuit 17.

The color hue controlling circuit 17 includes the first operational amplifier 25 and second operational amplifier 26, a variable resistor 27, and a plurality of resistors $R_{11}$ to $R_{16}$. An output terminal of the second operational amplifier 26 is connected to the CRT drive circuit 18.

When the vehicle stops, the vehicle speed detector 13 does not output the signal and the voltage is not applied to the liquid crystal panel 12. Therefore, the liquid crystal panel is transparent. The screen i.e., the images on the screen can be viewed from any direction of a front passenger's seat 21, rear passenger's seat 22, and driver's seat 20 of the vehicle.

During the vehicle run, the speed detector 13 is operated, the oscillator 14 is driven, and liquid crystal panel driving oscillator 14 is driven. Consequently, the voltage is applied to the liquid crystal panel 12. At this time, the direction toward an arrow marked direction A becomes discolored (in black). Therefore, the light from the screen of the CRT 11 toward the driver's seat 20 is interrupted so that the driver cannot view the screen of the CRT 11. Although the screen of the CRT 11 can be viewed from the front passenger's seat 21 and rear passenger's seat 22, the images on the screen of the CRT 11 viewed through the liquid crystal panel 12 to which the voltage is applied becomes blue since the light transmission characteristic becomes different according to a wavelength of the incident light.

To compensate such color hue, the following operation is carried out in the first preferred embodiment.

When the liquid crystal panel is operated, the light from the light emitting element 15 is transmitted through the liquid crystal panel 13 and irradiates the blue level element 16a and red level element 16b of the photo diode 16. At this time, a voltage output $V_1$ of the blue level element 16a and a voltage output $V_2$ of the red level element 16b are subtracted by means of the first operational amplifier 25 forming the hue controlling circuit 17. The output voltage of the first operational amplifier $e_2$ can be expressed as follows:

$$e_2 = V_2 - V_1.$$

The output voltage $e_2$ of the first operational amplifier 25 is changed to $e_3$ by means of a voltage $e_1$ of the variable resistor 27 and the first operational amplifier 26. The voltage $e_3$ is inputted into the CRT drive circuit 18 to control the color hue of the CRT 11.

Figure 3:
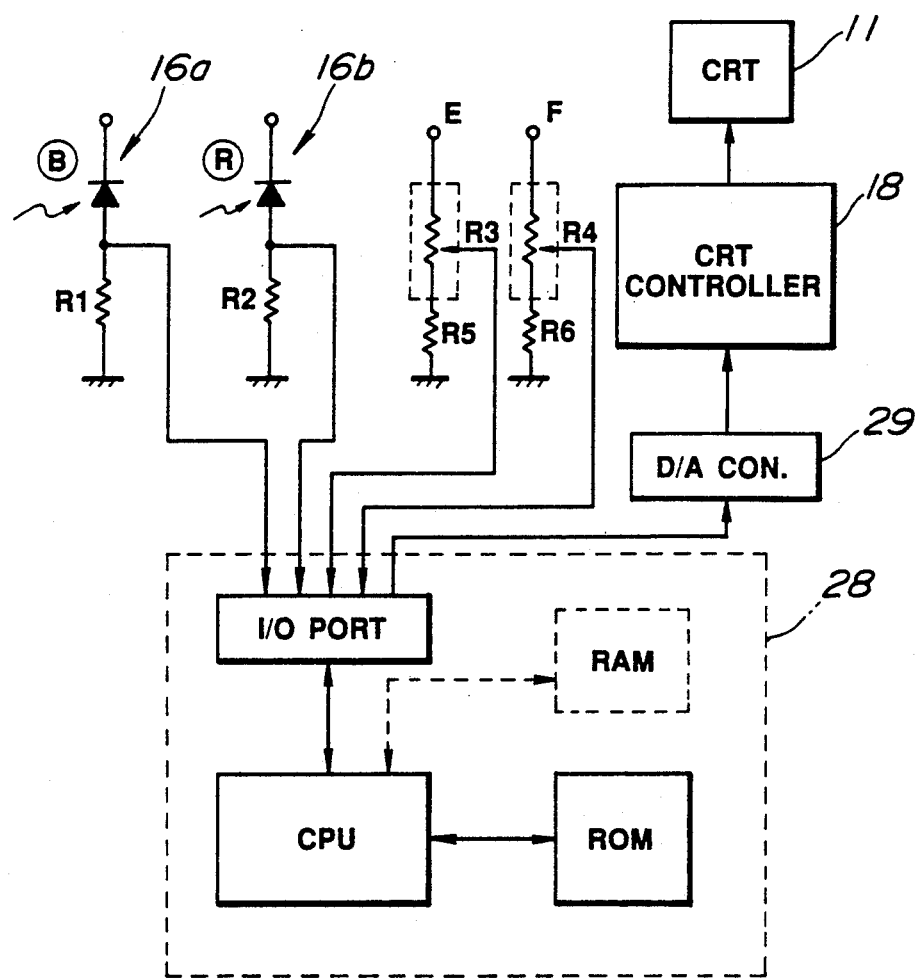
FIG. 3 is a schematic circuit block diagram of an alternative of the color hue controlling circuit using a microcomputer.

FIG. 3 shows a variation of the color hue control circuit 17 in which a microcomputer 28 is used in place of an analog circuit 17 using the operational amplifiers shown in FIG. 2.

A digital-to-analog converter 29 is connected between an I/O port of the microcomputer 28 and the CRT controller 18.

Figure 4:
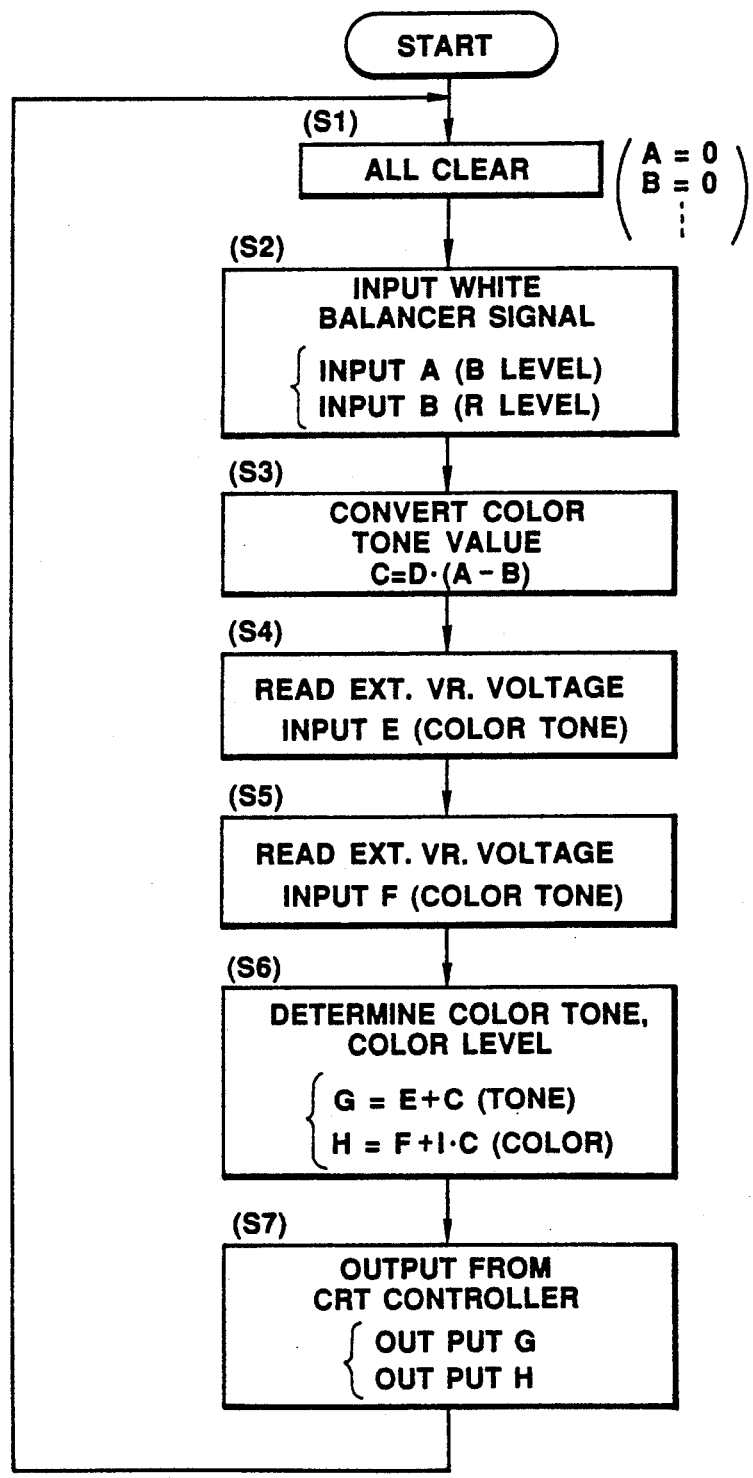
FIG. 4 is an operational flowchart of a routine executed by the microcomputer shown in FIG. 3.

FIG. 4 shows an operational flowchart executed by means of the microcomputer 28.

In a step $S_1$, a CPU in the microcomputer 28 clears all memories.

In a step $S_2$, the CPU inputs signals indicating that the blue level element 16a and red level element 16b receive the lights transmitted through the liquid crystal panel 12.

In a step $S_3$, the CPU derives a difference between the blue level signal A and the red level signal B and converts the difference into the color tone value C ($C = D \times (A - B)$).

Next, the CPU reads the external color tone signal E and color signal F in steps $S_4$ and $S_5$. Then, the CPU determines the levels of the color tone and color (G and H) in a step $S_6$. Then, the CPU outputs the color tone level G and color level H to the CRT controller 18 in a step $S_7$.

Figure 5:
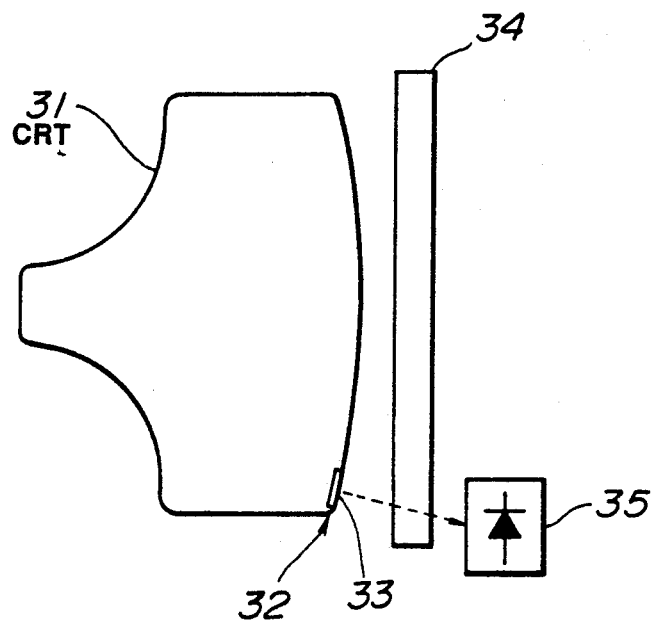
FIGS. 5 and 6 are schematic circuit block diagram of variations of a light emitting element shown in FIGS. 1 and 2.
Figure 6:
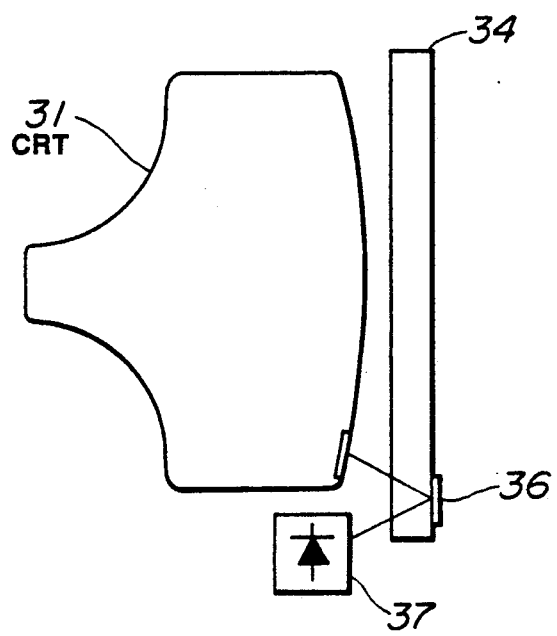

FIGS. 5 and 6 show variations of the white light emitting element 15 shown in FIG. 1.

In FIGS. 5 and 6, an end portion of the screen of the CRT 31 is formed with a superimpose (discoloring of white) portion 33. The light from the superimpose portion 33 is transmitted through the liquid crystal panel 12 and is received by the photo diode 35.

It is noted that, as shown in FIG. 6, a light reflecting film 36 is disposed on a part of the panel 12 so as to render the film 36 reflect the light from the superimpose portion 33 of the CRT screen to cause the light twice to transmit through the panel 12. Then, the photo diode 37 receives the light.

FIG. 7 shows a second preferred embodiment of the image displaying apparatus according to the present invention.

In FIG. 7, the liquid crystal panel 42 is disposed in a front space of the CRT screen 41.

The signal derived from the speed detector 43 causes the liquid crystal panel driving oscillator 44 to apply the voltage to the panel 41 to limit a visual recognition area in a direction to the driver's seat. A transistor circuit 45 provides means for driving the oscillator 44 in response to the signal derived from the speed detector 43.

Since the drive of the transistor circuit 45 means the operation of the liquid crystal panel 41, a signal from the transistor 45 causes a relay A contact (analog switch) 46 to be driven so that the relay contact A turns on or off a variable resistor 47. The color hue controlling circuit includes another operational amplifier 49 whose input terminals receive the voltage derived from an external variable resistor 48 for adjusting the color hue and the voltage of the DC level adjusting variable resistor 47. The output terminal of the other operational amplifier 49 is connected to an input terminal of the CRT controller 50.

When the vehicle stops, the vehicle speed detector 43 is not operated and the liquid crystal panel 52 becomes transparent. Then, when the vehicle runs and the speed detector 43 is operated, the oscillator 44 is driven through the transistor 45 so that the liquid crystal panel 42 becomes partially black. At this time, since the light transmitted through the panel 42 becomes blue due to the different transmission characteristic of the panel 42 according to the wavelength. Therefore, the relay contact A 46 is operated in response to the transistor 45. The voltage across the DC level variable resistor 47 is inputted to the other operational amplifier 49 together with the voltage of the color hue adjusting variable resistor 48. The voltage determined by the two variable resistors 47 and 48 is applied to the input terminal of the CRT controller 50 so that the images of the CRT 41 as viewed through the liquid crystal panel 42 are the same as those when the panel 42 is not operated. During the vehicle stop, the contact of the relay 46 is grounded so that the color hue is returned to that determined by the external variable resistor 48 and the liquid crystal panel 42 becomes transparent. The color hue of the CRT 11 is changed by a voltage set by means of the DC level adjusting variable resistor 47 during the vehicle run. Therefore, the color hue change due to the operation of the panel 42 is thus corrected.

It is noted that it is desirable for the speed detector to have a limit speed value for determining that the vehicle has run, the limit speed value being such that the vehicle has run even if the vehicle speed is very slow. For example, the speed detector comprises a sensor for detecting a pulse signal in proportion to the vehicle speed and has a time delay such that the sensor determines that the vehicle stops when the subsequent pulse signal is not detected after a lapse of a predetermined period of time of the detection of the pulse signal. The sensor is set so that the vehicle runs as the vehicle speed in very low even though a more time has taken upon the detection of the pulse signal with the predetermined period of time set as a long duration.

In the way described above, since the speed detector determines that the vehicle has run for a constant period of time upon the actual stop in a case where the vehicle run and stop are frequently repeated, no repetition of the operation and non-operation of the liquid crystal panel cannot be carried out.

As described hereinabove, in the image displaying apparatus according to the present invention, the voltage is applied to the visual controlling filter disposed in front of the screen of the CRT by means of the filter controlling means when the vehicle runs so that the light from the display device in the direction toward the driver's seat is interrupted. Although, at this time, the display device screen can be viewed through the visual controlling filter from the passenger's seats except the driver's seat, the transmission characteristic of the visual controlling filter becomes different according to the wavelength of the light when the visual controlling filter is operated (the voltage is applied to the visual controlling filter). Therefore, when the operation of the visual controlling filter is detected, the color hue controlling circuit is operated to control the color hue of the displaying apparatus. Thus, even if the visual controlling filter is operated or not operated, the images transmitted and viewed through the visual controlling filter are not changed and can be viewed as the same color images.

Consequently, all viewers in any direction can observe the images on the CRT screen with no unpleasant feeling.

It will fully be appreciated by those skilled in the art that the foregoing description has been made in terms of the preferred embodiments and various changes and modifications may be made without departing from the scope of the present invention which is to be defined by the appended claims.

What is claimed is:

1. An apparatus for displaying an image on a screen of a video equipment applicable to a vehicle, comprising:
   (a) a visual angle controlling filter for limiting a visual recognition area of the image appearing on the screen so that a light of the image directed toward a driver's seat of the vehicle is interrupted in response to an application of a voltage thereto;
   (b) first means for detecting the vehicle run;
   (c) second means for controlling the application of voltage according to the result of detection that the vehicle run;
   (d) third means for detecting whether the voltage is applied to the visual angle controlling filter; and
   (e) fourth means for controlling a color hue of the image on the screen in response to the detection result of the third means that the voltage is applied to the visual angle controlling filter.

2. An apparatus as set forth in claim 1, wherein the visual angle controlling filter comprises a liquid crystal filter disposed on a front space of the screen of the video equipment.

3. An apparatus as set forth in claim 2, wherein the second means turns on the application of the voltage to the liquid crystal panel when the vehicle runs and turns off the application of the voltage when the vehicle stops.

4. An apparatus as set forth in claim 3, wherein the third means comprises a light emitting element disposed in the vicinity of an edge of the liquid crystal panel for emitting a white light and a photo diode of a white balancer disposed in an opposite side of the liquid crystal panel for detecting a color hue of the liquid crystal panel and for adjusting the color hue.

5. An apparatus as set forth in claim 4, wherein the fourth means comprises a first differential amplifier having a first input terminal connected to a blue level element of the photo diode and a second input terminal connected to a second input terminal connected to a red level element of the photo diode and a second differential operational amplifier having a first input terminal connected to a variable resistor and a second input terminal connected to an output terminal of the first differential amplifier for deriving an addition of a voltage of the output terminal of the first differential amplifier to a variable resistor voltage and outputting the addition result to the fourth means, the output voltage $e_2$ of the first differential amplifier being derived as follows:

$e_2 = V_2 - V_1$, wherein $V_2$ denotes the output voltage of the blue element and $V_1$ denotes the output voltage of the red element.

6. An apparatus as set forth in claim 5, wherein the fourth means comprises a CRT controller for controlling the color hue of the CRT.

7. An apparatus as set forth in claim 4, wherein the third means further comprises a microcomputer having fifth means for reading voltages of a blue level element and a red level element of the photo diode; sixth means for converting the difference between the output voltage into a color tone value; seventh means for reading a color tone signal of an external variable resistor of the video equipment and a color signal of another external resistor of the video equipment; and eighth means for determining the color tone level and color level of the video equipment and outputting the determined color tone level and color level to a CRT controller constituting the fourth means.

8. An apparatus as set forth in claim 3, wherein the third means comprises a superimpose portion formed on an edge of the CRT screen so as to face against the edge of the liquid crystal panel and a photo diode for receiving the light passed through the superimpose portion and liquid crystal panel.

9. An apparatus as set forth in claim 3, wherein the third means further comprises a light reflecting film disposed on the edge of the liquid crystal panel and wherein the photo diode is disposed so as to receive the light reflected by the light reflecting film.

10. An apparatus as set forth in claim 1, which further comprises fifth means for generating the voltage to be applied to the visual angle controlling means, the voltage of the fifth means being applied through a transistor circuit constituting the second means in response to a signal derived from the first means indicating that the vehicle runs and the transistor circuit outputting a signal to the fourth means in response to the signal derived from the first means.

11. An apparatus as set forth in claim 10, wherein the fourth means comprises a switching element which connects a DC level adjusting variable resistor of the video equipment to a differential amplifier in response to the signal of the transistor circuit, the differential amplifier receiving the voltage of the DC level adjusting variable resistor and a voltage of a color hue adjusting variable resistor of the video equipment and outputting the addition result of the both variable resistors to a color hue adjusting input terminal of a CRT controller.

12. An apparatus as set forth in claim 1, wherein the first means comprises a speed detector which produces a signal when a pulse signal indicating that the vehicle runs is received from a speed sensor and when a next pulse signal subsequent to the present pulse signal is not received for a predetermined period of time.

13. An apparatus comprising:
(a) a visual angle controlling filter located in front of a screen of a video equipment, the visual angle controlling filter being capable of viewing an image appearing on the screen of the video equipment therethrough in directions except a particular direction in response to an application of predetermined interrupting means thereto;
(b) first means for detecting a condition of the application of the predetermined interrupting means;
(c) second means for controlling the application of the predetermined interrupting means according to the result of the detection of the condition;
(d) third means for detecting whether the predetermined interrupting means is applied to the visual angle controlling filter;
(e) fourth means for controlling a color hue of the image appearing on the screen of the video equipment in response to the result of detection by the third means so that the color hue of the image on the screen as viewed through the visual angle controlling filter does not change irrespective of the application of the predetermined interrupting means.

14. An apparatus as set forth in claim 13, wherein the apparatus is mounted on a CRT of the video equipment installed in a passenger compartment and the particular direction is a direction toward a driver's seat.

15. An apparatus as set forth in claim 14, wherein the visual angle controlling filter is a liquid crystal panel and the predetermined interrupting means is a predetermined voltage.

* * * * *